(12) United States Patent
Smith et al.

(10) Patent No.: US 9,528,728 B2
(45) Date of Patent: Dec. 27, 2016

(54) PARALLEL MAGNETIC REFRIGERATOR ASSEMBLY AND A METHOD OF REFRIGERATING

(75) Inventors: Anders Smith, Birkerod (DK); Christian R. H. Bahl, Taastrup (DK); Nini Pryds, Dragor (DK)

(73) Assignee: TECHNICAL UNIVERSITY OF DENMARK, KGS. Lyngby (DK)

( * ) Notice: Subject to any disclaimer, the term of this patent is extended or adjusted under 35 U.S.C. 154(b) by 1077 days.

(21) Appl. No.: 13/143,603

(22) PCT Filed: Jan. 29, 2010

(86) PCT No.: PCT/EP2010/051057
§ 371 (c)(1),
(2), (4) Date: Sep. 7, 2011

(87) PCT Pub. No.: WO2010/086399
PCT Pub. Date: Aug. 5, 2010

(65) Prior Publication Data
US 2011/0308258 A1 Dec. 22, 2011

Related U.S. Application Data

(60) Provisional application No. 61/148,633, filed on Jan. 30, 2009.

(30) Foreign Application Priority Data

Mar. 9, 2009 (GB) .................................. 09039744

(51) Int. Cl.
*F25B 21/00* (2006.01)

(52) U.S. Cl.
CPC ........ *F25B 21/00* (2013.01); *F25B 2321/0021* (2013.01); *Y02B 30/66* (2013.01)

(58) Field of Classification Search
CPC ....... F25B 21/00; F25B 7/00; F25B 2321/002; F25B 2321/0022; Y02B 30/66
See application file for complete search history.

(56) References Cited

U.S. PATENT DOCUMENTS 3,413,814 A 12/1968 Van Guens
3,623,549 A * 11/1971 Smith, Jr. ........... F28D 15/0266
165/104.14

(Continued)

FOREIGN PATENT DOCUMENTS

WO 2004/059221 7/2004
WO 2006/074790 7/2006

OTHER PUBLICATIONS

International Search Report mailed Apr. 21, 2010 in corresponding International Patent Application No. PCT/EP2010/051057.

*Primary Examiner* — Marc Norman
*Assistant Examiner* — Orlando Aviles Bosques
(74) *Attorney, Agent, or Firm* — Pillsbury Winthrop Shaw Pittman LLP

(57) ABSTRACT

A parallel magnetic refrigerator assembly, includes at least two magnetocaloric stages arranged in parallel connection, each having in use a cold side and a hot side; each magnetocaloric stage including hot and cold side heat exchange circuit for carrying a heat exchange fluid to respectively receive and transfer heat from the magnetocaloric stages; wherein the hot and cold side heat exchange circuit are configured such that in use a heat exchange fluid passes in thermal contact with the respective hot and cold sides of both magnetocaloric stages. The magnetocaloric stages have substantially the same temperature spans but different cold end and hot end temperatures. In this way the device temperature span may be substantially larger than the individual temperature span of each magnetocaloric stage.

8 Claims, 2 Drawing Sheets

(56) References Cited

U.S. PATENT DOCUMENTS

Figure 1:
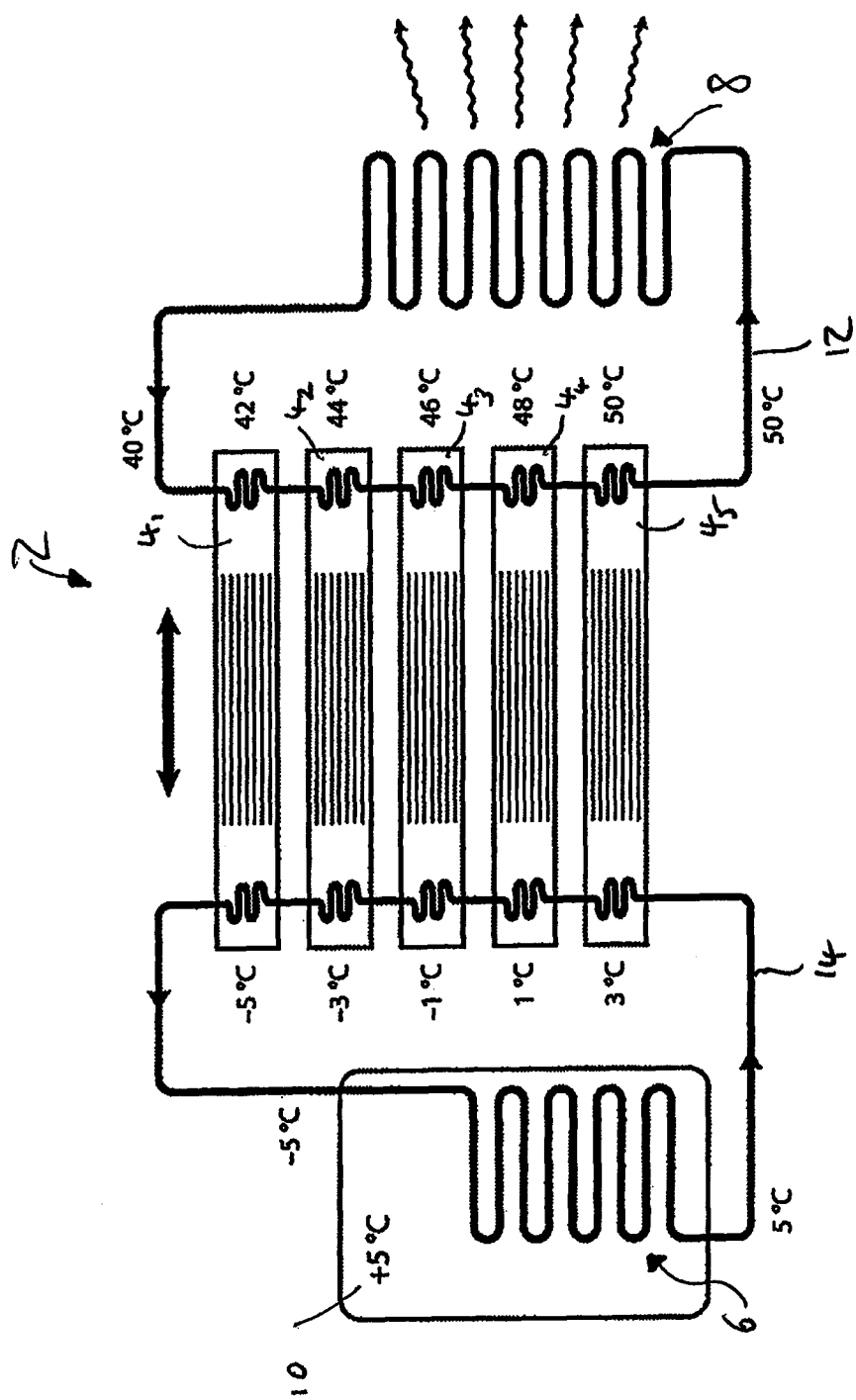

| | | | |
|---|---|---|---|
| 4,100,963 A * | 7/1978 | Dillenbeck | 165/231 |
| 5,249,424 A | 10/1993 | DeGregoria et al. | |
| 5,887,449 A | 3/1999 | Pecharsky et al. | |
| 6,467,274 B2 | 10/2002 | Barclay et al. | |
| 6,595,004 B1 | 7/2003 | Ghoshal | |
| 2007/0144181 A1 | 6/2007 | Kitanovski et al. | |
| 2007/0199332 A1 | 8/2007 | Muller et al. | |

* cited by examiner

PARALLEL MAGNETIC REFRIGERATOR ASSEMBLY AND A METHOD OF REFRIGERATING

CROSS REFERENCE TO RELATED APPLICATIONS

This application is the National Phase entry of PCT/EP2010/051057, filed Jan. 29, 2010, which claims priority to U.S. Provisional Patent Application No. 61/148,633, filed Jan. 30, 2009 and British Application No. 0903974.4, filed Mar. 9, 2009. The content of these applications is incorporated herein by reference in their entirety.

The present invention relates to a parallel magnetic refrigerator assembly and a method of refrigerating.

In a magnetic refrigerator utilising the typical active magnetic regenerator (AMR) cooling cycle, the active component is referred to as a magnetic regenerator and is formed of a magnetocaloric material, i.e. a material that heats up when placed in an applied magnetic field. Such materials have been known for a long time and it has been recognised that they could be used for cooling or heating purposes. Specifically, an active magnetic refrigerator typically comprises a magnetic regenerator arranged between a hot-side heat exchanger and a cold-side heat exchanger. A source of magnetic field, such as a permanent magnet or a solenoid, is also provided.

A heat transfer fluid acts as the vehicle for heat transfer and is arranged to flow back and forth between the cold-side heat exchanger to the hot-side heat exchanger through the active magnetic regenerator in a cycle. A magnetic field is repeatedly applied to and removed from the active magnetic regenerator, thereby causing it to heat up and cool down.

There are four stages to an active magnetic regenerator cycle. First, the application of a magnetic field warms the magnetic regenerator by the magnetocaloric effect, causing the heat transfer fluid within the regenerator to heat up. Second, heat transfer fluid flows in the direction from the cold-side heat exchanger to the hot-side heat exchanger. Heat is then released from the heat transfer fluid to the hot-side heat exchanger. Third, the magnetic regenerator is demagnetised, cooling the magnetocaloric material and the heat transfer fluid in the bed. Last, the heat transfer fluid flows through the cooled bed in the direction from the hot-side heat exchanger to the cold-side heat exchanger. The fluid takes up heat from the cold-side heat exchanger. The cold-side heat exchanger can then be used to provide cooling to another body or system.

The usefulness of an AMR refrigerator depends on several parameters:
1. Temperature span, i.e. the temperature difference between the cold end and the hot end of the magnetocaloric material.
2. Cooling capacity, i.e. the amount of heat which may be pumped (using the heat transfer fluid as a vehicle for transfer) from the cold end to the hot end per unit of time.
3. The temperature lift generated by the magnetocaloric effect, i.e. how much the overall (average) temperature of the heat transfer fluid is raised or lowered in stages one and three of the cycle, respectively. The lift determines in part the amount of heat available for heat exchanging at the cold end and the hot end.
4. Heat exchanger efficiency at the cold end and the hot end. This depends among other things on the lift, i.e. how much the temperature of the fluid exiting the AMR is below that of the desired cold end temperature.

The cooling capacity Q of an individual AMR is inversely related to the temperature span $\Delta T\text{span}$ of the AMR. To a good approximation a relationship of the form $Q=\beta-\alpha\cdot\Delta T\text{span}$ holds, where $\alpha$ and $\beta$ are positive constants depending on, among other things, the amount of active AMR material and the size of the magnetic field. For a given cooling capacity and a given size of the regenerator this means that the larger $\Delta T\text{span}$ is required, the larger a magnetic field is needed.

For typical permanent magnet configurations, such as Halbach arrays and modifications thereof, used in magnetic cooling, the maximum magnetic field attainable increases at best only logarithmically with the amount of magnetic material used. When a larger magnetic field is needed, the size of the magnet consequently increases exponentially. Since the magnet cost is a major, often the most significant, part of the cost of an AMR refrigerating system, this is a problem.

Magnetic refrigerators have been provided in which plural AMR stages are utilised in attempts to increase or optimise various factors such as cooling capacity or efficiency and the like. In U.S. Pat. No. 5,249,424 a system is disclosed which typically includes plural serially connected stages of AMR each having two beds of magnetocaloric material. Each stage is operated at a progressively lower temperature. Heat transfer fluid is arranged to flow through one set of the unmagnetised beds in each stage in series from the hot side to the cold side of each, and then in series through the other sets of magnetised beds in each stage from the cold side to the hot side of each.

U.S. Pat. No. 6,595,004 discloses an AMR system in which plural stages can be arranged in parallel and then a system of microelectromechanical (MEM) switches is used to provide for switching from a heat absorption phase to a heat rejection phase. Other examples of systems that use plural AMR stages within a magnetic refrigerator include US-A-2007/0144181, U.S. Pat. No. 5,887,449 and US-A-2007/0199332 which all disclose serial arrangements of AMR stages.

U.S. Pat. No. 6,467,274 discloses a parallel arrangement of magnetocaloric stages with a hot side and a cold side heat exchanger. Referring, for example to FIG. 6 of this document, a "series-parallel configuration" is disclosed in which three AMR stages 602 to 604 are connected in parallel and then three further stages 605 to 607 are connected in series. A resultant temperature of 20K is achieved which is sufficiently low to liquefy Hydrogen.

According to a first aspect of the present invention, there is provided a magnetic refrigerator assembly, comprising: a first magnetocaloric stage having a first temperature span arranged to receive a first heat transfer fluid for flow therein; a second magnetocaloric stage having a second temperature span arranged to receive a second heat transfer fluid for flow therein arranged in parallel relationship to the first magnetocaloric stage; wherein the first and second temperature spans are substantially the same but the absolute temperatures of the cold ends of the first and second magnetocaloric stages are different and/or the absolute temperatures of the hot ends of the first and second magnetocaloric stages are different.

In one embodiment, in use, each of the first and second magnetocaloric stages has a respective cold side and hot side; and each of the first and second magnetocaloric stages includes a hot side heat exchange circuit.

Preferably, the or each hot side heat exchange circuit is configured such that in use a heat exchange fluid passes first in thermal contact with the hot side of the first magnetocaloric stage and then in thermal contact with the hot side of the second magnetocaloric stage, wherein, in use, the temperature of the hot side of the first magnetocaloric stage is lower than that of the hot side of the second magnetocaloric stage.

Preferably, the magnetic refrigerator assembly further comprises, a hot side heat exchanger for connection to the hot side heat exchange circuit and a cold side heat exchanger for connection to the cold side heat exchange circuit.

In one embodiment, the cold side heat exchange circuit is configured such that the heat exchange fluid passes in thermal contact with the cold side of both the first and second magnetocaloric stages.

Preferably, more than two parallel magnetocaloric stages are provided.

Preferably, each of the magnetocaloric stages comprises a magnetocaloric unit and a magnetic field source to selectively magnetise and demagnetise the magnetocaloric unit.

In a preferred embodiment, the assembly comprises one or more pumps to pump heat transfer fluid through the magnetocaloric units in cycle with the magnetising and demagnetising thereof to achieve an active magnetic regeneration cycle.

Preferably, each of the magnetocaloric units comprises a magnetocaloric element having therein plural discrete paths for the flow of heat transfer fluid in reciprocating or rotating motion between a hot end and cold end in use.

Preferably, in the assembly, the temperature span of each of the first and second magnetocaloric stages is between 10 and 60° C.

Preferably, the temperature offset between each of the magnetocaloric stages is between 0.5 and 5° C.

In a preferred embodiment, the total span of the hot side and the total span of the cold side are different.

The present assembly contrasts with known parallel AMR system such as that disclosed in, say, U.S. Pat. No. 6,467,274. In U.S. Pat. No. 6,467,274 there is no contact between the heat exchange circuits on the hot side and this means that the temperature spans of consecutive stages (602, 603, 604) increase accordingly. If the temperature of the "cooling" side in the assembly of FIG. 6 of U.S. Pat. No. 6,467,274 is assumed to be the same for each of the AMR stages (602, 603, 604), since the cold side temperature reduces down the stages, all other factors being the same, the magnet required for the first stage 602, would have to be larger than that required for the second stage 603 and so on.

In the assembly disclosed herein, because each individual cold side and hot side heat exchanger no longer has to span the entire temperature lift, they may be constructed quite small and still be efficient. The hot side lift and the cold side lift need not be equal if different heat exchangers or refrigerant mass flows are used. This may be particularly advantageous where the ambient temperature varies and possibly other cases too.

According to a second aspect of the present invention, there is provided a parallel magnetic refrigerator assembly, comprising: a first magnetocaloric stage having in use a cold side and a hot side; a second magnetocaloric stage having in use a cold side and a hot side, arranged in parallel connection with the first magnetocaloric stage; the first and second magnetocaloric stages each including a hot side heat exchange circuit for carrying a heat exchange fluid to receive heat from the magnetocaloric stages and a cold side heat exchange circuit for carrying a heat exchange fluid to transfer heat to the magnetocaloric stages; wherein the hot side heat exchange circuit is configured such that in use a heat exchange fluid passes in thermal contact with the hot side of both the first and second magnetocaloric stages.

According to a third aspect of the present invention, there is provided a method of refrigeration and/or heat pumping, the method comprising in a magnetic refrigerator assembly having first and second magnetocaloric stages arranged in parallel with respective first and second temperature spans: providing a first heat transfer fluid and causing said first heat transfer fluid to flow in the first magnetocaloric stage; providing a second heat transfer fluid and causing said second heat transfer fluid to flow in the second magnetocaloric stage; wherein the first and second temperature spans are substantially the same but the absolute temperatures of the cold ends of the first and second magnetocaloric stages are different and/or the absolute temperatures of the hot ends of the first and second magnetocaloric stages are different.

According to a fourth aspect of the present invention, there is provided a method of refrigeration and/or heat pumping comprising using and/or operating a magnetic refrigeration assembly according to any other of the aspects of the present invention.

According to a further aspect of the present invention, there is provided a parallel magnetic refrigerator assembly, comprising: a first magnetocaloric stage having in use a cold side and a hot side connectable in use to a cold side heat exchanger and a hot side heat exchanger, respectively; a second magnetocaloric stage having in use a cold side and a hot side connectable in use to a cold side heat exchanger and a hot side heat exchanger, respectively, the second magnetocaloric stage being arranged in parallel connection with the first magnetocaloric stage; wherein the operating temperatures of the cold side of each of the first and second magnetocaloric stages is different and the operating temperatures of the hot side of each of the first and second magnetocaloric stages is also different such that the temperature span of each of the first and second magnetocaloric stages is substantially the same.

A refrigerator assembly is provided having at least a first and second AMR stages arranged in parallel connection with substantially the same temperature span but different cold end and hot end temperatures. In this way the device temperature span may be substantially larger than the individual temperature span of each AMR stage. A heat exchange fluid may be arranged to exit from one AMR stage and be fed into the next AMR stage in sequence. The total temperature span seen by the cold end heat exchanger is not the temperature lift of an individual AMR stage, but rather is the difference between the cold end temperatures of the first and last AMR. Any desired number of AMR stages may be provided. In one example any number from 2 to 10 or even more stages are provided.

Preferably, each of the magnetocaloric stages comprises a magnetocaloric unit and a magnetic field source to selectively magnetise and demagnetise the magnetocaloric unit.

Preferably, the assembly comprises one or more pumps to pump heat transfer fluid through the magnetocaloric units in cycle with the magnetising and demagnetising thereof to achieve an active magnetic regeneration cycle.

In one embodiment, each of the magnetocaloric units comprises a magnetocaloric element having therein plural discrete paths for the flow of heat transfer fluid between a hot end and cold end in use.

In a preferred embodiment, the paths are graded in the direction of fluid flow such that the magnetic transition temperature of the materials from which the element is made varies along the plural discrete paths.

Preferably, the temperature span of each of the first and second magnetocaloric stages is between 10 and 60° C. The temperature offset between each stage may be between about 0.5 and about 5° C.

Figure 2:
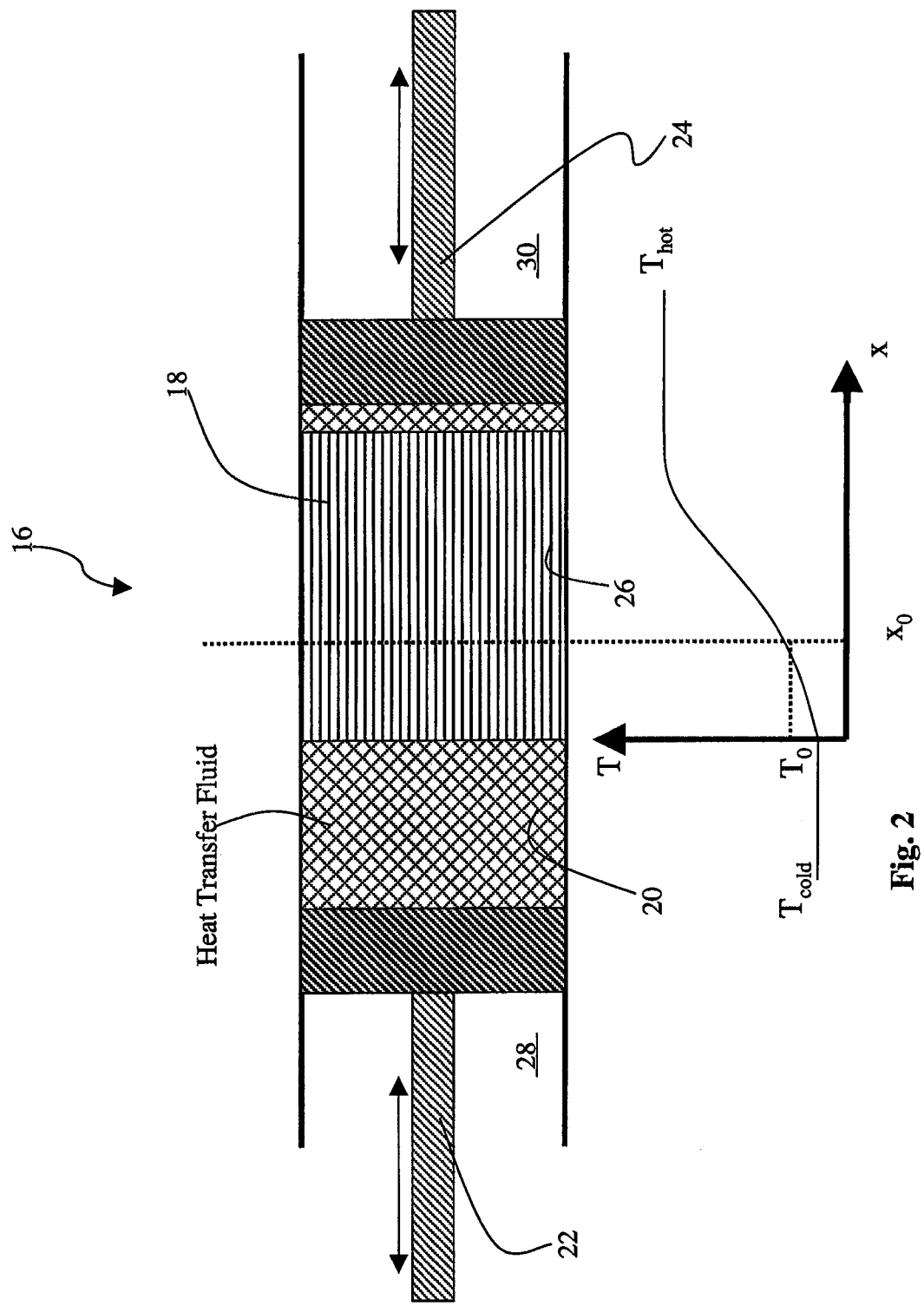

Embodiments of the present invention will now be described by way of example with reference to the accompanying drawings, in which:

FIG. 1 shows a schematic representation of a parallel magnetic refrigerator assembly; and FIG. 2 shows a schematic representation of a magnetocaloric stage.

FIG. 1 shows a schematic representation of a parallel magnetic refrigerator assembly. The term "assembly" is used since the assembly includes plural magnetocaloric stages. It will be appreciated that the assembly could be a unitary piece of apparatus or a selectively configurable collection of stages. It will also be understood that the assembly described herein as a "refrigerator assembly" could equally be used or described as a "heat pump".

The refrigerator assembly 2 comprises five AMR stages $4_1$ to $4_5$ arranged in parallel. They are said to be arranged in "parallel" in that each contains its own magnetocaloric component (not shown in FIG. 1) and executes its own active magnetic regenerator cycle with its own dedicated path for heat transfer fluid. In other words, there are parallel discrete paths for heat transfer fluid. The path for the heat exchange fluid, and therefore heat within the assembly as a whole, is from the hot side of one of the AMR stages to the hot side of another and so forth. The same applies for the cold sides of the AMR stages $4_1$ to $4_5$.

A cold side heat exchanger 6 is provided on the cold side and a hot side heat exchanger 8 is provided on the hot side of the refrigerator assembly 2. In the example shown the hot side heat exchanger 8 is arranged to give up heat to the atmosphere and the cold side heat exchanger 6 is arranged within an enclosure 10 to provide refrigeration to the enclosure. The enclosure might be a refrigerator such as a domestic or industrial refrigerator.

A path 12, which in this case is continuous, is provided through the hot sides of the AMR stages $4_1$ to $4_5$ through which a heat exchange fluid is arranged to flow. The heat exchange fluid will typically be forced to flow along a heat conducting conduit that is arranged to pass in thermal contact with the hot sides of the AMR stages $4_1$ to $4_5$. As the heat exchange fluid passes through the hot sides of the AMR stages $4_1$ to $4_5$ it picks up heat from the heat transfer fluid, described below, used within the AMR stages $4_1$ to $4_5$.

On the cold side of the refrigerator, a similar arrangement exists. A path 14, which in this case is continuous, is provided through the cold sides of the AMR stages $4_1$ to $4_5$ through which a heat exchange fluid is arranged to flow. The heat exchange fluid will typically be forced to flow along a heat conducting conduit that is arranged to pass in thermal contact with the cold sides of the AMR stages $4_1$ to $4_5$. As the heat exchange fluid passes through the cold sides of the AMR stages $4_1$ to $4_5$, heat which the heat exchange fluid picked up from the cold side heat exchanger is given up to the heat transfer fluid. Heat exchange fluids and heat transfer fluids are chosen according to the temperature ranges and materials of the AMR stages and heat exchangers. Non-limiting examples include water and brine.

Thus, there is a flow of both heat exchange fluids within each of the heat exchangers 6 and 8 and also a flow of heat transfer fluid within each of the AMR stages $4_1$ to $4_5$.

The assembly enables an increase in the overall device temperature span, without an increase in the size of any of the permanent or electromagnets used.

This is done by having plural, i.e. two or more, AMR stages operating in parallel with the same temperature span but different cold end and hot end temperatures. The temperature spans of the plural AMR stages are the same with the absolute temperatures being offset with respect to adjacent stages. The total span (of the assembly as a whole) $\text{Span}_{total}$ can be expressed as $$\text{Span}_{total} = \text{span}_{stage} + (n-1)x$$

where there are n AMR stages in parallel and the temperature offset is x° C.

In this way the assembly temperature span may be substantially larger than the individual temperature span of each AMR stage. The heat exchange fluid (refrigerant) within the heat exchange system exits from one AMR stage and is fed into the next AMR stage in sequence. The total temperature span seen by the cold end heat exchanger is not the temperature lift of an individual AMR stage, but rather is the difference between the cold end temperatures of the first and last AMR.

Using the relationship of the form $Q=\beta-\alpha \cdot \Delta \text{Tspan}$ mentioned above, consider a single AMR with 1 liter of active regenerator volume having $\beta=300$ W and $\alpha=5$ W/° C. At a temperature span of 40° C., this corresponds to a cooling capacity of 100 watt, when operated optimally.

If the required temperature span is increased from 40 to 50° C., the cooling capacity will fall to 50 watts (300−(5× 50)). Thus, the regenerator volume must be doubled to keep the cooling capacity unchanged (or the maximum magnetic field must be increased). However, this will also at least double the required magnet volume.

Using an assembly such as that shown in FIG. 1, n (where n is an integer larger than 1) AMRs—each having an active regenerator volume of 1/n liter and a temperature span equal to the original 40° C.—may be coupled in parallel, in such a way that the temperature difference between the cold side of the first AMR stage and the hot side of the last AMR stage is equal to 50° C. Thus, the combined span of the assembly provides the (new) necessary temperature span of 50° C. Each AMR stage still operates optimally for a cooling capacity of essentially 100/n watts, since they are 1/n of the size of the original AMR and will operate at the same temperature span. Therefore, the cooling capacity of the entire system will still be essentially 100 watts, without an increase in the volume of regenerator required.

Importantly, a need for a larger magnet is thus obviated. Instead, n smaller magnets (one for each of the AMR stages connected in parallel) are provided, having a total size equal to the original magnet. In some embodiments it is possible that fewer than n magnets will be needed as the assembly may be arranged such that when the magnetocaloric component of one of the stages is being magnetised, the magnetocaloric component of one of the other stages is demagnetised and so a single magnet can be shared between two or more AMR stages in the assembly. The fact that the size of any one magnet is not increased more than balances the slightly less efficient heat exchange in each individual AMR stage and the number of additional components such as flow tubes and drive trains that may be added to the assembly.

In the specific non-limiting example shown, starting at the top as seen in the figure and referring to the first of the AMR stages $4_1$, the hot side temperature is 42° C. and the cold side temperature is −5° C. Thus, the temperature span of the stage is 47° C. The same temperature span is provided for each of the other AMR stages $4_2$ to $4_5$ too.

Importantly, the entire assembly of FIG. 1 has a temperature span of 55° C. (the difference between the temperatures of the hot end of the bottom stage (50° C.) and the cold end of the top stage (−5° C.)), despite each individual ones of the AMR stages needing only a temperature span of 47° C. The lift of each of the stages is only 2° C., although the total span of the cold side as a whole is 10° C. (5−(−5)=10° C.).

The path for the flow of heat exchange fluid on both the hot and the cold side is continuous. For example on the hot side, the heat exchange fluid flows within the heat exchange system from the hot end of the first AMR stage (at 42° C.) to the hot end of the second AMR stage (at 44° C.) etc. This means that the heat exchange fluid on the cold side progressively cools as it flows through the AMR stages, as the span of each individual device is substantially the same.

The cold side refrigerant (heat exchange fluid) enters the refrigerator at 5° C. and exits at −5° C. It is cooled progressively by heat exchange with each of the five AMR stages in turn. For instance, the fluid enters the bottommost AMR stage at 5° C. and is cooled to 3° C. by heat exchanging with the AMR stage. Thus, it enters the second AMR stage at 3° C. and is further cooled to 1° C. Internally in each of the AMR stages, heat transfer fluid is pushed back and forth in an ordinary AMR cycle. Each AMR stage is drawn as a linear, reciprocating regenerator for simplicity, e.g. as described in the applicant's copending applications and granted patents based on WO-A-2006/074790 and described in greater detail below. However, it will be appreciated that it may also be any other type of regenerator, e.g. rotary design.

On the hot side, refrigerant exits from the bottommost AMR stage $4_5$ at 50° C., radiates heat, e.g. to the atmosphere, and enters the topmost AMR stage at 40° C. When passing through the AMR stages, the refrigerant takes up heat progressively from the internal heat transfer fluid in a manner analogous to the way in which the refrigerant on the cold side gives up heat at each stage as it passes through the cold sides of the AMR stages.

In a preferred example, each AMR stage is functionally graded, as described in previous patent applications of the applicant. In other words, the magnetic transition temperature of the magnetocaloric component varies along the heat transfer fluid flow path within each of the AMR stages, in such a way that it is optimised for operation in the required temperature interval.

In one particular embodiment, each AMR stage may be constructed according to a rotary design in which a substantially cylindrical magnetocaloric component is arranged to rotate about an axis of permanent magnet, shaped so as to expose sections of the magnetocaloric component to a varying magnetic field as it rotates. Other configurations may also be used.

In use, the optimum number of parallel stages may be determined by a consideration of the required overall temperature span, the efficiency of heat exchange at the device cold end and hot end, and the cost of adding additional components (such as flow tubes) to the assembly.

The total span of the hot side and the total span of the cold side need not be equal if different heat exchangers or refrigerant mass flows are used. This may be an advantage when the ambient temperature varies and possibly in other cases too.

The modular design allows for the possibility of custom fitting the working range of the device. Thus, if operated in very hot surroundings (e.g., in the tropics), further parallel AMR stages may be added to increase the temperature at which heat is expelled at the hot side. Conversely, if cooling to low temperatures is not needed, the AMR stage operating at the lowest temperature may be removed. In this way, the device may be made to operate optimally at a given characteristic ambient and/or cold end temperature.

FIG. 2 shows a schematic representation of an example of a component magnetic refrigerator (without the heat exchangers) that could be used as an AMR stage in the device of FIG. 1.

The component refrigerator 16 comprises a magnetocaloric stage. A heat transfer fluid 20 is provided for being forced back and forth through the magnetocaloric stage 18. In the example shown, pistons 22 and 24 are provided for forcing the heat transfer fluid 20 through the magnetocaloric unit 18 in a reciprocating linear motion.

A magnet (not shown) is also provided for selectively applying a magnetic field to the magnetocaloric unit 18 and removing the magnetic field. The magnet may be a permanent magnet or an array of such magnets, an electromagnet or a solenoid. For low temperature applications the solenoid may be formed of superconductive material and be cooled by a cryogenic liquid such as liquid nitrogen or liquid helium.

In the specific example shown, a vertical section through the magnetocaloric unit 18 is shown. The magnetocaloric unit 18 comprises plates 26 defining therebetween passages or paths along which the heat transfer fluid 20 flows.

Also shown in FIG. 2 is a graph of the variation of temperature of the magnetocaloric unit in the direction x, from the cold-side heat exchanger to the hot-side heat exchanger. A temperature gradient is established between the cold-side 28 and the hot-side 30. The temperature T(x) at any position x varies between temperatures $T_{cold}$ and $T_{hot}$. In view of the recognised fact that the magnetocaloric effect of a material varies with temperature and is at a maximum at or near the magnetic transition temperature of the material, the plates are preferably formed such that the magnetic transition temperature of the plates 26 within the magnetocaloric unit 18 varies in the direction between the cold-side 28 and the hot-side 30.

For the sake of clarity in the example shown, the heat exchangers and the conduits for the heat exchange fluid are not shown. It will be appreciated that in practice the conduits for the heat exchange fluid are arranged such as to enable heat transfer, e.g. by conduction, between the heat transfer fluid 20 and the heat exchange fluid. A more detailed description of the component refrigerator is provided in our copending International Patent application having application number PCT/EP2005/013654 and publication number WO-A-2006/074790 (and granted patents based thereon), the entire contents of which are hereby incorporated by reference.

The material or materials used to form the plates 26 of the magnetocaloric unit 18 in the example shown in FIG. 2 may preferably be non-corroding materials, i.e. materials that substantially do not corrode upon exposure to a liquid such as a heat transfer fluid. The use of ceramic materials is particularly preferred as this avoids the problem of corrosion connected with conventional use of metallic materials such as gadolinium in magnetic regenerators.

A method of refrigeration is also disclosed. The method comprises refrigerating using an assembly having plural AMR stages connected in parallel. Preferably, the temperature span of each of the stages is the same but the actual operating temperatures are offset such that a greater temperature span can be achieved for the device as a whole without the larger magnets that would be required were a single device to be made to operate over the required temperature range.

Embodiments of the present invention have been described with particular reference to the examples illustrated. However, it will be appreciated that variations and modifications may be made to the examples described within the scope of the present invention.

The invention claimed is:

1. A magnetic refrigerator assembly, comprising:

a first magnetocaloric stage configured to operate with a first temperature span, and arranged to receive a first heat transfer fluid for flow in the first magnetocaloric stage; and a second magnetocaloric stage configured to operate with a second temperature span, arranged to receive a second heat transfer fluid for flow in the second magnetocaloric stage, and arranged in parallel relationship to the first magnetocaloric stage;

wherein the first and second temperature spans are substantially the same but the absolute temperatures of cold ends of the first and second magnetocaloric stages are different and/or the absolute temperatures of hot ends of the first and second magnetocaloric stages are different, wherein each of the first and second magnetocaloric stages have a respective cold side and hot side, each of the first and second magnetocaloric stages include a hot side heat exchange circuit, and each of the first and second magnetocaloric stages include a cold side heat exchange circuit;

wherein the hot side heat exchange circuit is a closed circuit configured to allow a first heat exchange fluid to continuously circulate within the hot side heat exchange circuit so that the first heat exchange fluid passes sequentially through the hot side of the first magnetocaloric stage, then through the hot side of the second magnetocaloric stage, and then through a hot side heat exchanger, and after passing through the hot side heat exchanger the first heat exchange fluid flows within the hot side heat exchange circuit to the hot side of the first magnetocaloric stage thereby defining the hot side heat exchange circuit, and wherein, with the first heat exchange fluid passing through the hot side heat exchange circuit, the temperature of the hot side of the first magnetocaloric stage is lower than that of the hot side of the second magnetocaloric stage; and wherein the cold side heat exchange circuit is a closed circuit, fluidly isolated from the hot side heat exchange circuit and configured to allow a second heat exchange fluid to continuously circulate within the cold side heat exchange circuit so that the second heat exchange fluid passes sequentially through the cold side of the second magnetocaloric stage, then through the cold side of the first magnetocaloric stage, and then through a cold side heat exchanger, and after passing through the cold side heat exchanger the second heat exchange fluid flows within the cold side heat exchange circuit to the cold side of the second magnetocaloric stage, thereby defining the cold side heat exchange circuit, and, wherein, with the second heat exchange fluid passing through the cold side heat exchange circuit, the temperature of the cold side of the second magnetocaloric stage is higher than that of the cold side of the first magnetocaloric stage.

2. The magnetic refrigerator assembly according to claim 1, comprising one or more pumps to pump the first and second heat transfer fluid through the first and second magnetocaloric stages, respectively, in cycle with the magnetizing and demagnetizing of the magnetocaloric unit to achieve an active magnetic regeneration cycle.

3. The magnetic refrigerator assembly according to claim 1, wherein the temperature span of each of the first and second magnetocaloric stages is between 10 and 60° C.

4. The magnetic refrigerator assembly according to claim 1, wherein the temperature between each stage is offset by a temperature difference ranging between 0.5 and 5° C.

5. The magnetic refrigerator assembly according to claim 1, wherein a total temperature span of the hot ends and a total temperature span of the cold ends are different.

6. The magnetic refrigerator assembly according to claim 1, wherein the magnetic refrigerator further comprises additional magnetocaloric stages other than the first and second magnetocaloric stages; and wherein all of the magnetocaloric stages are arranged in parallel.

7. The magnetic refrigerator assembly according to claim 6, wherein each of the magnetocaloric stages comprises a magnetocaloric unit and a magnetic field source to selectively magnetize and demagnetize the magnetocaloric unit.

8. The magnetic refrigerator assembly according to claim 7, wherein each of the magnetocaloric units comprises plural discrete paths for the flow of heat transfer fluid in reciprocating or rotating motion between a hot end and cold end in use.

* * * * *